3,112,995
MANUFACTURE OF ALUMINA FROM THE REACTION OF AMMONIUM HYDROXIDE WITH ALUMINUM SULFATE
James Hoekstra, Evergreen Park, Ill., assignor to Universal Oil Products Company, Des Plaines, Ill., a corporation of Delaware
No Drawing. Filed Aug. 22, 1961, Ser. No. 133,021
8 Claims. (Cl. 23—143)

The present application is a continuation-in-part of my co-pending application, Serial Number 795,582, filed February 26, 1959, which application was a continuation-in-part of my co-pending application, Serial Number 612,109, filed September 26, 1956, both said earlier applications being now abandoned. The invention described therein relates to the preparation of alumina; more specifically, the present invention is directed toward a method permitting the use of aluminum sulfate as the source of aluminum, which method involves maintaining particular conditions during the formation of the alumina, as well as during those subsequent procedures required to produce such alumina in a finished form.

Alumina, in its many anhydrous forms, or as an aluminum oxide hydrate, is extensively employed throughout a wide variety of the chemical and petroleum industries. Alumina is used as a catalyst in and of itself, in combination with other inorganic oxides, and quite often serves as a highly refractory carrier material for other catalytic components. Various physical modifications of the previously mentioned forms of alumina result in an alumina which is commonly referred to as "activated alumina," having an especially desired type of catalytic activity, as well as the high degree of adsorptive capacity desired when serving as a dehydrating, treating or purifying agent. Alumina is very stable up to temperatures of about 1800° F. or more, and, in view of this unique physical property, finds widespread use as a special type of refractory material. For a variety of other uses, alumina is often combined with other inorganic refractory oxide material such as silica, magnesia, hafnia, titania, thoria, boron oxide, zirconia, etc., and mixtures of the same, all of which possess certain desired physical characteristics. Whatever its intended use, it is necessary that the alumina be substantially pure and especially free from contaminants which, if present, might induce adverse effects toward any of the functions previously described.

An object of the present invention is to provide a method for manufacturing alumina of high-purity, which alumina is especially suitable for utilization as a carrier material for other catalytically active components.

One of the first commercial methods for alumina production involved the recovery of aluminum oxide from naturally occurring clays and earths. This method involved a long, arduous process, produced an alumina of comparatively low purity, and was relatively expensive. Many investigations have since been conducted in manufacturing processes to produce a relatively inexpensive, high-purity alumina. Precipitation methods have been studied whereby a weak alkaline material, such as an aqueous solution of ammonium hydroxide, is added to an aqueous solution of an aluminum salt to form a dense precipitate of alumina. However, because of certain physical characteristics imparted to the resulting alumina, and which inherently result from the use of ammonium hydroxide in the reaction, the precipitate thus formed is difficult to convert to a form which is suitable for any of the functions previously described. As a consequence, other, more expensive alkaline materials must be employed as prepicitants and the precipitation methods therefore become difficult to justify economically. In addition, even though the alkaline precipitant may be suitable, not all of the salts of aluminum are advantageously employed therewith. For example, when aluminum sulfate, which is readily obtainable at low cost, is employed, the precipitate formed is notoriously difficult to process to its final form. Washing to remove various contaminants is extremely tedious, and although washing by filtration is used, relatively long periods of time are required to produce an acceptable filter cake which can readily be dried and formed into the desired shape, and/or further treated for use as a carrier material for catalytic components. There is some evidence that the above described difficulties are peculiar to alumina and do not arise to any great extent in the manufacture of other refractory oxides exemplified by those hereinbefore set forth.

A specific object of the present invention is to provide an economical precipitation method for manufacturing alumina from aluminum sulfate, which method comprises simultaneously commingling an aqueous solution of ammonium hydroxide and an aqueous solution of aluminum sulfate, thereby producing a high-purity alumina which is easily filtered, and which readily lends itself to further processing as an active catalytic carrier material.

In one embodiment, the present invention provides a method for manufacturing alumina which comprises simultaneously commingling an aqueous solution of ammonium hydroxide and an aqueous solution of aluminum sulfate, controlling the rate of addition of each of said solutions to maintain the resulting reaction mixture at an acidic pH constantly within the range of from about 5.0 to 7.0, throughout the commingling of said aqueous solutions and during the precipitation of alumina, discontinuing the commingling of said aqueous solutions after the precipitation of said alumina, separating the precipitated alumina from the reaction mixture and thereafter increasing the pH of the precipitated alumina to a level in excess of 7.5.

In another embodiment, the present invention relates to a method for manufacturing alumina which comprises simultaneously, adding an aqueous solution of ammonium hydroxide and an aqueous solution of aluminum sulfate to a mixing zone and therein commingling the solutions, maintaining the resulting reaction mixture at an acidic pH constantly within the range of from about 5.5 to 6.5 throughout the commingling of said solutions and during the precipitation of alumina, discontinuing the addition of aluminum sulfate solution after the precipitation of said alumina and continuing the addition of the ammonium hydroxide solution until the pH is increased to a level within the range of about 7.5 to about 8.5, and then separating the precipitated alumina from the reaction mixture.

In a more limited embodiment, the present invention provides a method for manufacturing alumina which comprises simultaneously commingling an aqueous solution of ammonium hydroxide and an aqueous solution of aluminum sulfate, maintaining the resulting reaction mixture at an acidic pH constantly within the range of from about 5.5 to 6.5 throughout the commingling of said aqueous solutions and during the precipitation of alumina, discontinuing the addition of aluminum sulfate solution after the precipitation of said alumina and continuing the addition of the ammonium hydroxide solution until the pH is increased to a level of about 8.0, then filtering the alumina precipitate from the reaction mixture, and washing the resultant filter cake with water of sufficient alkalinity to maintain the filter cake at a pH of about 8.0.

In a specific embodiment, the present invention is directed to a method for manufacturing granular alumina which comprises simultaneously adding an aqueous solution of ammonium hydroxide and an aqueous solution of aluminum sulfate to a mixing zone and therein commingling the solutions, controlling the rate of addition of the solutions to said zone to maintain the resulting reaction mixture at an acidic pH of about 6.0 throughout the commingling of said aqueous solutions and during the precipitation of alumina, discontinuing the addition of aluminum sulfate solution after precipitation of said alumina and continuing the addition of the ammonium hydroxide solution until the pH is increased to a level of about 8.0, then filtering the alumina precipitate from the reaction mixture, washing the resultant filter cake with water containing ammonium hydroxide in an amount sufficient to maintain the filter cake at a pH in excess of 7.5, and drying the washed filter cake at a temperature of from about 600° F. to about 1200° F.

Conventional, prior art methods for precipitating alumina involve the procedure of adding a solution of one compound to a vessel containing a large supply of the other compound. For example, in this manner, a solution of ammonium hydroxide is added to a vessel which contains a large amount of an aqueous solution of an aluminum salt, thereby precipitating alumina. However, the pH during this precipitation method either starts at a low level and increases, or starts at a high level and slowly decreases. The alumina so produced has an extremely low solids content and is very difficult to wash because of its inherently poor filtration characteristics. These poor characteristics, and the low solids content, are more prevalent when ammonium hydroxide is employed to precipitate alumina from a solution of aluminum sulfate. Prior art precipitation methods do not recognize that such difficulties exist, for they generally consider all aluminum salts, the chloride, nitrate, sulfate, etc., to be equivalent. I have discovered, however, that when the pH of the mixture of ammonium hydroxide and aluminum sulfate is constantly maintained acidic, and within a particular range thereof, throughout the period of mixing, as well as during the ensuing precipitation of alumina, a dense, granular precipitate is obtained which has a relatively high solids content, is readily filtered because of its more granular character, and may be readily washed for the purpose of effecting the removal of various contaminants. I have found that an acidic pH within the range of from about 5.0 to about 7.0 overcomes the difficulties hereinabove described, and yields an alumina which is readily processed to a final form. At an acidic pH below 5.0, the precipitation yields an alumina gel of large, sticky agglomerates, from which sulfate and/or chloride ions are difficult to remove. Precipitation at an alkaline pH level, above 7.0, results in poor filtration characteristics and a low solids content. The control of the pH at a level of about 6.0, neither below about 5.5, or above about 6.5, while simultaneously commingling the solutions of ammonium hydroxide and aluminum sulfate, and while precipitating the alumina, is particularly preferred, in order to insure against experiencing the difficulties arising at a pH below 5.0, or above the neutral point, 7.0.

When the desired quantity of alumina has been precipitated, it has been found to be beneficial to raise the pH of the precipitated alumina to a level within the range of 7.5 to about 8.5, with the point of control being a pH of 8.0 Although the alumina precipitate may be washed by any suitable procedure, a particularly preferred method comprises filtering the precipitate from its aqueous suspension, and continuing the suction on the underside of the filter cake as the washing solution is added to the top of the filter cake. This method tends to decrease the quantity of alumina which is inherently lost and subsequently recovered through the use of other methods. In addition, filtering produces the alumina in a form which is easily handled and which is readily adaptable for further processing. The precipitated alumina may be separated from the total reaction mixture and thereafter washed with water, for the removal of various impurities, of sufficient alkalinity to increase the pH of the precipitated alumina to a level in excess of about 7.5, maintaining this alkaline pH throughout the washing procedure. The pH of the precipitated alumina may be increased prior to separating the same from the total reaction mixture by discontinuing the addition of aluminum sulfate, following the precipitation of the alumina, and continuing the addition of the ammonium hydroxide until the pH attains a level in excess of about 7.5, and this method is preferred.

As hereinbefore stated, the alumina, after washing by filtration, may be dried and subsequently formed into any desired shape such as pills, cakes, extrudates, granules of powder, etc., or the alumina may be redissolved and subsequently formed into spheres if this is the desired shape. If desired, the alumina may be further processed without previously drying the same. When the alumina is to be used as an active catalytic carrier material, it may be impregnated with various catalytic components such as metals, halides, sulfides, oxides, etc. or mixtures of the same. It is understood that the impregnation may be effected either before or after the alumina has been dried and/or formed. Usually, the drying treatment is effected at a temperature of from about 600 to about 1200° F., although a temperature of from about 800° F. to about 1000° F. is preferred.

Although the method of the present invention is adaptable for processes which utilize other aluminum salts such as the halides, nitrates, etc., it is particularly directed to the method which employs aluminum sulfate. As hereinbefore set forth, the use of the sulfate of aluminum was not heretofore economically justified due to the poor quality of the alumina so produced. Aluminum sulfate is, however, one of the more abundant compounds of aluminum and, therefore, the present invention has the economical advantage afforded through its use. The sulfate may be obtained from any suitable source, either naturally occurring or synthetically produced. At the present time, a large quantity of relatively pure aluminum sulfate is available as a by-product from many of the processes designed to recover the catalytically active metal components from alumina base catalysts which have become deactivated. For example, these processes generally involve extraction of the alumina within the catalyst with sulfuric acid. It is not intended, however, to limit the present invention to this particular source of aluminum sulfate.

It is preferred to employ aqueous solutions of the ammonium hydroxide and aluminum sulfate and any suitable concentrations may be used. For ease in handling, metering, and applying the method of the present invention, aqueous solutions of from about 15% to about 40% by weight are preferred, although other concentrations may be advantageously used. The solutions are added simultaneously to any suitable vessel containing a mechanism for mixing, and which is equipped with a suitable means for determining the pH of the resulting mixture while the solutions are being added. The rates of addition of either and/or both the solutions of ammonium hydroxide and aluminum sulfate are adjusted continuously to maintain the mixture at a constant acidic pH within the aforesaid range.

Briefly, the present invention involves adding a sufficiently small amount of aluminum sulfate to a small amount of water to bring the initial contents of the vessel to the acidic pH level at which the commingling and precipitation are effected. The solutions of ammonium hydroxide and aluminum sulfate are then simultaneously added, the rates of either or both being continuously adjusted to maintain the pH of the mixture at that level originally selected. When the desired quantity of alumina has been precipitated, the addition of aluminum sulfate is stopped and the addition of the solution of ammonium hydroxide continued until the pH is increased to a level within the range of about 7.5 to about 8.5, controlled at 8.0, at which time the solution of ammonium hydroxide is no longer added. The resultant mixture is then filtered and subseqeuntly washed by slurrying with water which contains a very small quantity of ammonium hydroxide, followed by filtering the resulting slurry. The precipitate filters very rapidly, and produces a cake which is relatively high in solids content. The slurry with water continues until the filtrate indicates a negative test for sulfate ions. It has been found to be beneficial to utilize hot water for the washing procedure in order to take advantage of its solubilizing characteristics. Hot water in this sense is intended to refer to water having a temperature of from about 75° F. to about 200° F.

The following examples are presented to further illustrate the novelty and utility of the method of the present invention; it is not intended to limit unduly the same to the conditions and/or concentrations employed therein, or beyond the scope and spirit of the appended claims.

*Example I*

56 grams (62 milliliters) of an aqueous solution of 28% by weight of ammonium hydroxide (a pH of 12.8) was placed in a glass beaker, and an aqueous solution of 28% by weight of aluminum sulfate (pH of about 3.3) was added until the pH of the resulting mixture was 8.0; the addition of aluminum sulfate solution was then stopped.

The resulting precipitate was filtered from the accompanying solution by pouring the slurry onto a filter paper in a Buchner funnel, and applying suction to the filter flask. The filter cake collected on the filter paper was thereafter washed with 700 milliliters of hot water containing one milliliter of the above 28% ammonium hydroxide solution while the filter cake was retained in the funnel and while suction was continuously applied to the flask. The solids content of the filter cake after this initial washing step was only 9.0% by weight. Nine washes with the water-ammonium hydroxide solution were required before the filtrate indicated a negative test for sulfate ions. The rate of filtration was extremely slow during the last four washing treatments, and the final filter cake indicated a solids content of 14.0% by weight.

Example I illustrates the difficulty encountered in washing and filtering the precipitate when the pH of the ammonium hydroxide-aluminum sulfate mixture is not constantly maintained acidic, and within a particular range, while the alumina is being precipitated.

*Example II*

50 milliliters of water were placed in a glass beaker, to which was added about 3 milliliters of an aqueous solution of 28% by weight of aluminum sulfate (pH of 1.5). The pH of the resulting solution was adjusted to a level of about 6.0 by adding a sufficient amount of an aqueous solution of 28% by weight ammonium hydroxide (a pH of 12.8). The aqueous solutions of aluminum sulfate and ammonium hydroxide were then added continuously and simultaneously at such rates as to maintain the pH of the resulting reaction mixture at about 6.0, not varying below 5.5, or above 6.5. The addition was continued until 200 grams (156 milliliters) of the aluminum sulfate solution and 56 grams (62 milliliters) of the ammonium hydroxide solution had been mixed.

An additional 5 grams of the ammonium hydroxide solution was then added to raise the pH of the mixture to 8.0, which is considered a favorable pH for effecting the filtration treatment. When the mixture was poured on a six-inch Buchner funnel, the filtration was effected in one minute, and yielded a filter cake having a solids content of 15.0% by weight.

The filter cake was further washed six times by slurrying with 700-milliliter portions of hot water containing one milliliter of the ammonium hydroxide solution. Each filtration required one minute or less, and the final solids content of the filter cake was determined to be 15.7% by weight. The filtrate from the sixth washing step indicated a negative test for sulfate ions.

Example II illustrates the process of the present invention whereby a firm, readily filterable precipitate may be formed by commingling ammonium hydroxide and aluminum sulfate at a particular acidic pH.

*Example III*

As in the previous example, the 28% by weight solutions of ammonium hydroxide and aluminum sulfate were admixed continuously and simultaneously. The pH of the mixture, however, was maintained constant at an alkaline pH of about 8.0. The solids content of the filter cake was determined to be only 9% to 10% by weight. A total of seven washes with the previously described water-ammonium hydroxide mixture was required to obtain a sulfate-free filtrate. The filtration characteristics were very poor as indicated by the length of time necessary for each filtration (each washing by filtration requiring five minutes).

Example III illustrates the criticality of maintaining a constant acidic pH within the range of from about 5.0 to about 7.0, as set forth in the several embodiments of the present invention. When pH is not maintained constant within this range, the precipitate formed by commingling ammonium hydroxide and aluminum sulfate is low in solids content, and is extremely difficult to wash because of its poor filtration characteristics.

The foregoing examples and specification clearly illustrate the benefits derived by utilizing the method of the present invention. The difficulties heretofore encountered in the manufacture of alumina, employing ammonium hydroxide and aluminum sulfate, have been overcome by the method of the present invention to a distinct economical advantage.

I claim as my invention:

1. A method for manufacturing granular alumina which comprises simultaneously adding an aqueous solution of ammonium hydroxide and an aqueous solution of aluminum sulfate to a mixing zone and therein commingling the solutions, controlling the rate of addition of said solutions to said zone to maintain the resulting reaction mixture at an acidic pH constantly at a level within the range of from about 5.5 to about 6.5 throughout the commingling of said aqueous solutions and during the precipitation of alumina, discontinuing the addition of the aluminum sulfate solution after the precipitation of said alumina and continuing the addition of the ammonium hydroxide solution until the pH is increased to a level within the range of about 7.5 to about 8.5, and then separating the precipitated alumina from the reaction mixture.

2. The method of claim 1 further characterized in that said acidic pH is maintained at a level of about 6.0.

3. The method of claim 1 further characterized in that said pH is increased to an alkaline level of about 8.0 through the continued addition of the ammonium hydroxide solution.

4. The method of claim 1 further characterized in that impurities are removed from said precipitated alumina by washing with water.

5. A method for manufacturing granular alumina which comprises simultaneously adding an aqueous solution of ammonium hydroxide and an aqueous solution of aluminum sulfate to a mixing zone and therein commingling said solutions, controlling the rate of addition of said solutions to said zone to maintain the resulting reaction mixture at an acidic pH constantly at a level of about 6.0 throughout the commingling of said aqueous solutions and during the precipitation of alumina, discontinuing the addition of the aluminum sulfate solution after the precipitation of said alumina and continuing the addition of the ammonium hydroxide solution until the pH is increased to a level of about 8.0, then filtering the alumina precipitate from the reaction mixture, and washing the resultant filter cake with water.

6. The method of claim 5 further characterized in that said water contains ammonium hydroxide.

7. The method of claim 5 further characterized in that the washed filter cake is dried at a temperature from about 600° F. to about 1200° F.

8. A method for manufacturing granular alumina which comprises simultaneously adding an aqueous solution of ammonium hydroxide and an aqueous solution of aluminum sulfate to a mixing zone and therein commingling the solutions, controlling the rate of addition of said solutions to said zone to maintain the resulting reaction mixture at an acidic pH of about 6.0 throughout the commingling of said aqueous solutions and during the precipitation of alumina, discontinuing the addition of the aluminum sulfate solution after precipitation of said alumina and continuing the addition of the ammonium hydroxide solution until the pH is increased to a level of about 8.0, then filtering the alumina precipitate from the reaction mixture, washing the resultant filter cake with water containing ammonium hydroxide and drying the washed filter cake at a temperature of from about 600° F. to about 1200° F.

References Cited in the file of this patent

UNITED STATES PATENTS

| | | |
|---|---|---|
| 2,657,115 | Ashley | Oct. 27, 1953 |
| 2,838,444 | Teter et al. | June 10, 1958 |
| 2,867,588 | Keith et al. | Jan. 6, 1959 |
| 2,894,898 | Oettinger et al. | July 14, 1959 |
| 2,913,400 | Burton et al. | Nov. 17, 1959 |
| 2,919,973 | Stillwell et al. | Jan. 5, 1960 |
| 2,984,630 | Braithwaite | May 16, 1961 |